United States Patent [19]

Koga et al.

[11] Patent Number: 4,931,879
[45] Date of Patent: Jun. 5, 1990

[54] IMAGE PROCESSING SYSTEM FOR RECORDING OR REPRODUCING AN IMAGE SIGNAL SEQUENCE WHICH HAS BEEN ENCODED BY EMPLOYING TWO PREDICTIVE CODING METHODS AND COMBINING THE RESULTS OF THOSE METHODS

[75] Inventors: Toshio Koga; Junichi Ohki; Mutsumi Ohta, all of Tokyo; Hideto Kunihiro, Osaka, all of Japan

[73] Assignees: NEC Corp.; NEC Home Electronics Ltd., both of Japan

[21] Appl. No.: 189,249

[22] Filed: May 2, 1988

[30] Foreign Application Priority Data

| Apr. 30, 1987 | [JP] | Japan | 62-108350 |
| Apr. 30, 1987 | [JP] | Japan | 62-108352 |
| Jun. 12, 1987 | [JP] | Japan | 62-147433 |
| Jun. 12, 1987 | [JP] | Japan | 62-147434 |
| Jun. 12, 1987 | [JP] | Japan | 62-147435 |
| Jun. 12, 1987 | [JP] | Japan | 62-147436 |

[51] Int. Cl.$^5$ .............................................. H04N 5/76
[52] U.S. Cl. ................................... 358/335; 358/430; 358/133
[58] Field of Search .............. 358/12, 13, 14, 15, 358/310, 335, 133, 135, 136, 426, 430; 371/30; 360/8, 33.1

[56] References Cited

U.S. PATENT DOCUMENTS 4,517,596 5/1985 Suzuki .............................. 358/13 X
4,603,347 7/1986 Kuroda et al. ...................... 358/13

*Primary Examiner*—Robert L. Richardson
*Attorney, Agent, or Firm*—Ostrolenk, Faber, Gerb & Soffen

[57] ABSTRACT

In an image recording system for use in recording a sequence of coded signals on a recording medium, such as a CD-ROM in response to a sequence of image signals divisible into a succession of frames each of which is subdivided into a plurality of splits, the image signals are selectively subjected to interframe coding and intraframe coding in a coder to be coded into first and second error signals, respectively, under control of a coding control circuit. The intraframe coding may be carried out about a selected split at every frame, at every preselected period, or at predetermined positions of each scene. The second and the first error signals are rearranged into the coded signals by delaying the second error signal relative to the first error signal. Such a second error signal serves to reproduce an initial image on reproducing the coded signals and enables a reverse reproduction, a quick search, a high speed reproduction, and the like in a reproducing system.

11 Claims, 10 Drawing Sheets

IMAGE PROCESSING SYSTEM FOR RECORDING OR REPRODUCING AN IMAGE SIGNAL SEQUENCE WHICH HAS BEEN ENCODED BY EMPLOYING TWO PREDICTIVE CODING METHODS AND COMBINING THE RESULTS OF THOSE METHODS

BACKGROUND OF THE INVENTION

This invention relates to an image processing system for use in combination with a recording medium, such as a compact disk read-only memory (abbreviated to a CD-ROM) to record and/or reproduce a sequence of image signals.

Recent attempts have been directed to a system for recording and reproducing a sequence of image signals on a CD-ROM which has been used only for recording and reproducing an audio signal.

According to the standard of the CD-ROM, such a CD-ROM should have a maximum readout rate of 150 kilobytes and a memory capacity of 540 megabytes. As long as the CD-ROM complies with this standard, a single frame of image signals should be coded into a coded signal of 5 kilobytes on condition that thirty frames of image signals appear for one second. Therefore, efficient coding or redundancy reduction coding is indispenable for recording or reproducing the image signals. Otherwise, it is impossible to reproduce a sequence of moving images from the CD-ROM. Herein, efficient coding may simply be called information reduction.

If information reduction is possible such that a single frame of the image signals is coded into a coded signal of 5 kilobytes, a long play reproduction of about one hour can be achieved as regards the image signals by the use of the CD-ROM.

In reality, a proposal for a color image recording CD-ROM has been offered which realizes as long a reproduction time as about one hour with a usual audio signal recording CD-ROM. In this case, the image signals are recorded on the color image recording CD-ROM in the form of a sequence of predictive error signals which appear as results of efficient coding and which may be referred to as a sequence of compressed image signals. The predictive coding may be carried out in a manner known in the field of data transmission. Such efficient coding may be, for example, interframe coding which is carried out with reference to both a present image signal and a past image signal and which is useful to favorably reduce the amount of significant information when coding a sequence of image signals.

In the meanwhile, it may be preferable for the CD-ROM to be able to perform not only normal reproduction but also a wide variety of other functions, such as a reverse reproduction, a high speed reproduction, scene skipping, an arbitrary reproduction from an arbitrary scene, as well as a video tape. However, it is difficult to perform the above-exemplified functions as long as the image signals are subjected to the interfame coding alone. More particularly, let us consider the image signals to be divided into a frame sequence from a first or leading frame to an end or trailing frame as leading through trailing compressed image signals are subjected to the interframe coding, respectively, and that the signals are successively recorded on the CD-ROM from the leading compressed image signal to the trailing compressed image signal in a normal order. Herein, the first through the end frames may be considered to correspond to first through end scenes, respectively, for convenience of description.

Now, under these circumstances, suppose that it is attempted to reproduce the image signals from the CD-ROM in a reverse order, starting from the end scene in response to a request issued from an operator or user to indicate the reverse reproduction. In this event, a non-significant or meaningless image is reproduced from the CD-ROM, irrespective of the images that were desired to be reproduced from the image signals. This is because no past image signals exist when reproducing the trailing compressed image signal is attempted. Likewise, it is also difficult to carry out such a reverse reproduction from an intermediate scene between the first and the end scenes.

This is also true of the high speed reproduction, the scene skipping, and the arbitrary reproduction from an arbitrary scene.

Nonsignificant reproduction of images may also be carried out when scenes are changed from one to another on recording compressed image signals as mentioned above.

SUMMARY OF THE INVENTION:

It is an object of this invention to provide an image processing system which is for use in combination with a recording medium, such as a CD-ROM, and which can perform a wide variety of functions in spite of the fact that a sequence of image signals is subjected to predictive coding.

It is another object of this invention to provide an image recording system which is operable as a part of an image processing system of the type described and which is capable of recording the image signals on the recording medium so that a reverse reproduction can be carried out either from an end scene or from an intermediate scene in response to a request of an operator or user.

It is still another object of this invention to provide a recording system of the type described, which is helpful for performing a high speed reproduction, skipping, an arbitrary reproduction, and so on.

It is yet another of this invention to provide a reproducing system which can reproduce a sequence of compressed image signals in various manners.

An image recording system to which this invention is applicable is for use in recording a sequence of recording signals on a recording medium by subjecting a sequence of image signals, respectively, to redundancy reduction coding. The image signals are representative of a sequence of moving images and divisible into a sequence of image units each of which is composed of the image signals. According to an aspect of this invention, the image recording system comprises code control means for producing a code control signal which represents, in order to carry out the redundancy reduction coding, a selected one of a first predictive coding methode and a second predictive coding method which are carried out with a reference to a first correlation between adjacent ones of the image units and a second correlation of the image signals within each image unit, respectively, coding means is responsive to the code control signal and the image signal sequence for selectively coding the image signal sequence into a sequence of coded signals by carrying out the selected one of the first predictive coding method and the second predictive coding method in response to the code control signal. The coded signal sequence carries both a first result of signal resulting from the first predictive coding method and a second result signal resulting from the second predictive coding method which is interlaced with the frist result signal. The system further comprises means for recording the coded signal sequence on the recording medium as the recording signals.

According to another aspect of this invention, there is provided an image reproducing system which is for use in reproducing a sequence of coded signals into a sequence of reproduced signals. The coded signal sequence conveys a sequence of moving image signals divisible into a sucession of image units. The coded signal sequence selectively comprises a first portion which is the result of a first predictive coding method carried out with reference to a first correlation between adjacent ones of the image units and a second portion which is the result of a second predictive coding method carried out with reference to a second correlation of the image signals within a single one of the image units. The image reproducing system comprises deriving means responsive to the coded signal sequence for deriving only the second portion from the coded signal sequence and means coupled to the deriving means for successively reproducing, as the reproduced signal sequence, the second portion derived from the deriving means.

Figure 1:
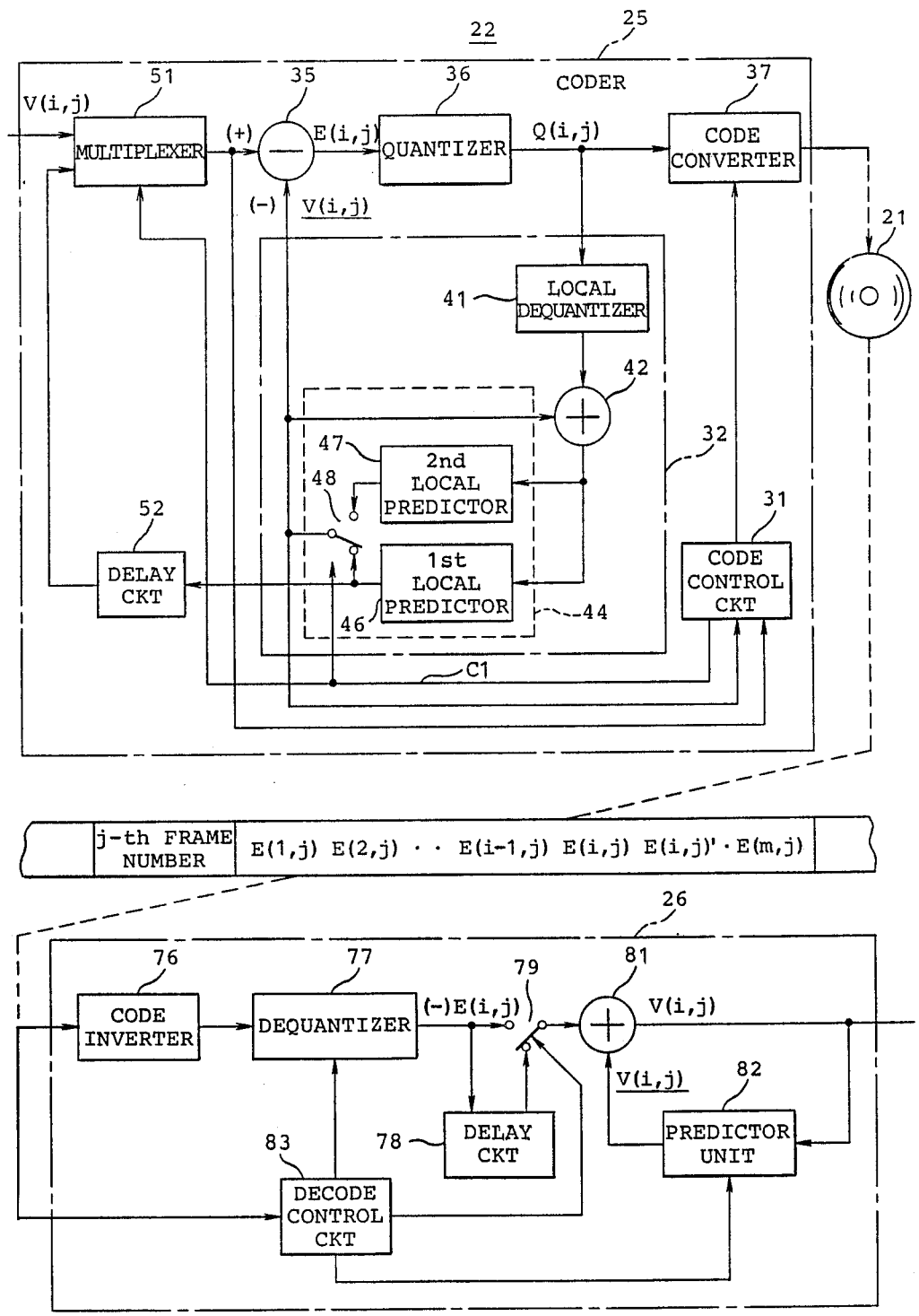
FIG. 1 is a block diagram of an image processing system according to a first embodiment of this invention.

DESCRIPTION OF THE PREFERRED EMBODIMENTS:

Referring to FIG. 1, an image processing system according to a first embodiment of this invention is for use in combination with a recording medium specified by a CD-ROM 21 to record and reproduce a succession of moving images which lasts for a finite interval of time and which represents a sequence of scenes. In order to record and reproduce the moving images, the illustrated processing system comprises a recording system 22 and a reproducing system 23 for recording and reproducing the moving images on and from the CD-ROM 21, respectively. For brevity of description, the illustrated recording and reproducing systems 22 and 23 are specified by a coder 25 and a decoder 26, respectively.

The image succession is conveyed by a sequence of image signals V which is divisible into first through n-th frames. Each frame may be called an image unit and is composed of a predetermined number of picture elements, as well known in the art.

Figure 2:
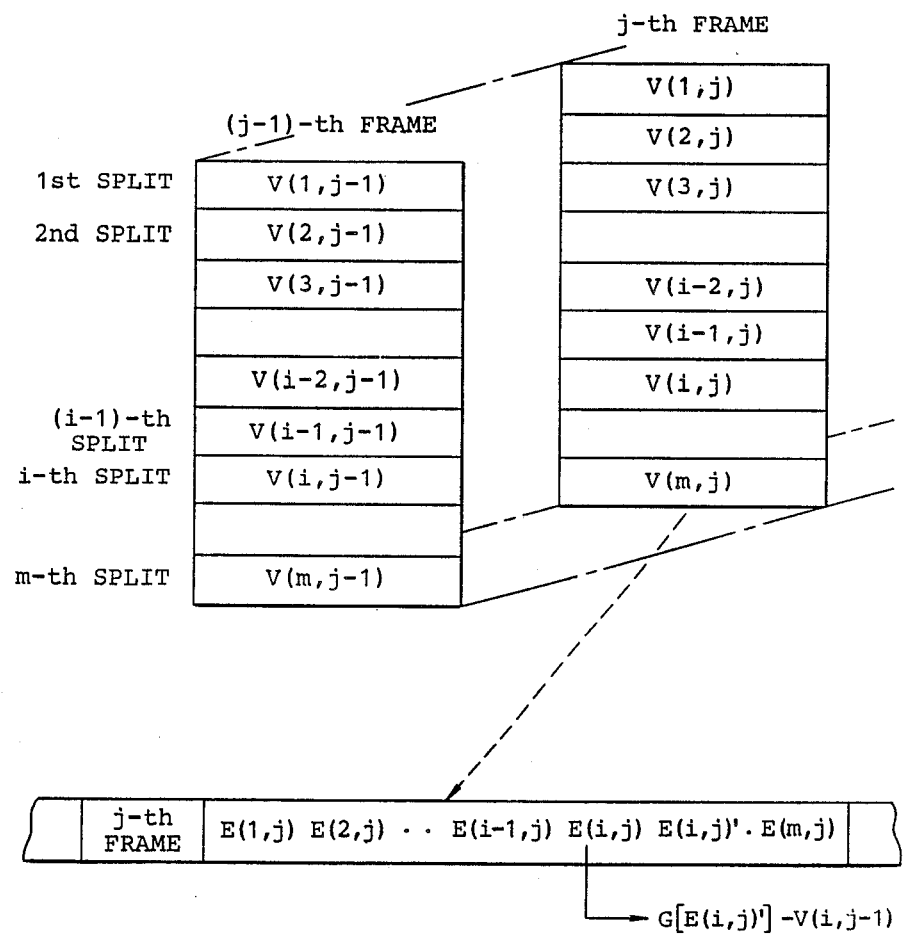
FIG. 2 shows a relationship between a succession of frames and a signal format to described an operation of the image processing system illustrated in FIG. 1.

Temporarily referring to FIG. 2 together with FIG. 1, each of the frames is also horizontally subdivided into first through m-th fractions or splits, as illustrated in FIG. 2. In FIG. 2, (j−1)-th and j-th frames are illustrated as representatives of the first through n-th frames, where n is a positive integer and j is variable between unity and n, both inclusive, and are subdcivided into first through m-th horizontal splits of which the image signals may be depicted at $V(i, j-1)$ and $V(i, j)$, respectively, where i is variable between unity and m, both inclusive. In this connection, the first suffixes in parentheses are representative of the numbers of the splits while the second suffixes, the numbers of the frames.

Referring back to FIG. 1, the image signals $V(i, j)$ are supplied from a preprocessing circuit (not shown in this figure) to the coder 25 of the recording system 22, as readily understood from FIG. 2.

The illustrated coder 25 selectively carries out interframe coding and intraframe coding in a manner to be described later. The interframe coding and the intraframe coding will be collectively called predictive coding. The interframe coding carries out the predictive coding with reference to a first correlation between adjacent ones of the frames, namely, image units, while the intreframe coding carries out the predictive coding with reference to a second correlation of the image signals within each frame. In this connection, the interframe coding and the intraframe coding will be individually called first predictive coding and second predictive coding, respectively.

It is known in the art that the interframe coding is very effective to reduce an amount of significant information conveyed by the image signals in comparison with the intraframe coding when the image signals predominantly include a still portion rather than a moving portion. However, it is to be pointed out that such interframe coding is not helpful for auxiliary functions, such as a reverse reproduction, a high speed reproduction, and so on, except a normal reproduction, as mentioned in the preamble of the instant specification. In this situation, it has been found out that such auxiliary functions can be preferably performed by interleaving the intraframe coding with the interframe coding in a manner to be described later.

In order to interleave the intraframe coding with the interframe coding, the coder 25 comprises a coding control circuit 31 and a local decoder 32 controlled by the coding control circuit 31, as will become clear later.

Now, the illustrated coder 25 comprises a subtracter 35 which is successively supplied with the image signals represented by V(i, j) and a sequence of prediction signals which are representative of a sequence of prediction values of the image signals V(i, j) and which are therefore depicted at $\underline{V(i, j)}$. The subtracter 35 successively calculates errors or differences between the image signals V(i, j) and the prediction signals $\underline{V(i, j)}$ to produce a sequence of error signals E(i, j) indicative of the errors.

The error signals E(i, j) are successively sent to a quantizer 36 to be quantized into a sequence of quantized signals Q(i, j). Herein, it is known in the art that a distribution of errors between the image signals of the frames can be approxiamated by a Laplace distribution which is specified by a nonlinear curve. Therefore, the illustrated quantizer 36 is assumed to have a nonlinear quantization characteristic defined by a logarithmic curve. The quantizer 36 converts each level given by the error signals E(i, j) into a corresponding one of the quantized signals Q(i, j) that carries a level number in a known manner.

The quantized signals Q(i, j) are successively delivered to a code converter 36 on one hand and to the local decoder 32 on the other hand. The code converter 37 is controlled by the coding control circuit 31, as will become clear as the description proceeds, and converts each of the quantized signals Q(i, j) into a sequence of variable length code signals under control of the coding control circuit 31. The variable length code signals may be referred to as a sequence of coded signals and are recorded on the CD-ROM 21 as a sequence of recording signals. Thus, the code converter 37 serves to store or record each of the coded signals as the recording signals on the CD-ROM 21 and may therefore be called a recording circuit for recording the coded signals.

The local decoder 32 comprises a local dequantizer 41 which is supplied with the quantized signals Q(i, j) and which locally dequantizes or inversely quantizes the quantized signals Q(i, j) into a sequence of local dequantized signals which are local reproductions of the error signals E(i, j). The local dequantized signals are sent to an adder 42 coupled to a prediction circuit 44.

The illustrated prediction circuit 44 comprises a first local predictor 46, a second predictor 47, and a switch element 48. The first local predictor 46 has a delay circuit having a first delay time equal to a single frame and carries out prediction in response to a sequence of output signals of the adder 42 to produce a sequence of first local prediction signals representative of first results of prediction. From this fact, it is readily understood that the first local predictor 46 serves to carry out interframe prediction. The second local predictor 47 has another delay circuit having a second delay time equal to a predetermined time shorter than the single frame and carries out intraframe prediction to produce a sequence of second local prediction signals representative of said results of the intraframe prediction. The predetermined time may be equal to a single sample time or a single scanning period.

In FIG. 1, the first and the second local predictors 46 and 47 are switched by the switch element 48 under control of the coding control circuit 31 from one to another in consideration of a specific one of the auxiliary functions that may be the reverse reproduction of the recording signals. In other words, the second predictive coding is interleaved with the first predictive coding so that the reverse reproduction can be carried out in the reproducing system 23. In the illustrated example, the image signals V(i, j) are processed in the coder 25 at every split i of the frames j, as shown in FIG. 2. In each frame j represented by (i+k), the image signals V(i, j) are subjected to the second or intraframe predictive coding at a selected one of the splits that is variable at every frame in accordance with the following formula:

$$i + k \pmod{m}, \tag{1}$$

where k is a variable which takes zero and a natural number. Such a selected one of the splits may be referred to as an intraframe coding split because the intraframe coding is carried out in connection with the above-mentioned split at every frame. From Formula (1), it is readily understood that the intraframe coding split in each frame is shifted downwards of FIG. 2 one by one as the frames are changed forwardly from the first frame towards the n-th frame and that each split becomes such an intraframe coding split at every (m−1)-th frame. For example, when the split number m is equal to four and the zeroth split of the zeroth frame becomes the intraframe coding split, the zeroth split of the fourth frame becomes the intraframe coding split again. Thus, the intraframe coding splits are interspersed in the frames and cyclically changed at every (m−1)-th frames. Such a cyclic change of the intraframe coding splits serves to make an image quality uniform, as known as a refresh effect in a field of data transmission. The interleaving operation of the interframe coding and the intraframe coding might be also similar to a split refresh technique known in a field of data transmission. In FIG. 2, it is assumed that the (i−1)-th split of the (j−1)-th frame and the i-th split of the j-th frame are determined as the intraframe coding splits.

According to Formula (1), the intraframe coding is carried out only when Formula (1) holds. Otherwise, the interframe coding is carried out in the illustrated coder 25.

Herein, it is to be noted that the image signals specified by V(i, j) are subjected in the coder 25 to the interframe coding to be produced as a sequence of first prediction error signals E(i, j) given by:

$$E(i, j) = (i, j) - \underline{V(i, j)} \tag{2}$$

when Formula (1) does not hold and where $\underline{V(i, j)}$ are indicative of prediction signals of the V(i, j). Herein, it is mentioned that the prediction signals $\underline{V(i, j)}$ are produced from a preceding image signal $\underline{V(i, j-1)}$ of the (j−1)-th frame or previous frame. On the other hand, when Formula (1) holds, the image signals V(i, j) are subjected to the intraframe coding to be produced as a sequence of second prediction error signals E(i, j)' given by:

$$E(i, j)' = F(V(i, j)), \tag{3}$$

where F is representative of a prediction function determined for the intraframe coding.

The coder 25 illustrated in FIG. 1 can selectively carry out the interfame coding or the intraframe coding in consideration of Formulae (1), (2), and (3) so as to enable the reverse reproduction in a manner to be presently described.

Now, the image signals V(i, j) are delivered to a multiplexer 51 connected to a delay circuit 52 which will later be described. The multiplexer 51 V(i, j) allows the image signals V(i, j) to pass therethrough as long as the interframe coding is indicated by the coding control circuit 31, namely, Formula (1) does not hold. In this event, the switch circuit 48 is connected to the first local predictor 46 in the prediction circuit 44. For this purpose, the multiplexer 51 and the switch circuit 48 are controlled by a first control signal C1 sent from the coding control circuit 31.

In this situation, the image signals V(i, j) are sent through the multiplexer 51 to the subtracter 35 which is supplied with the prediction signals V(, j) given for the first local predictor 46 as first results of the interframe coding of the image signals V(i, j). In consequence, the subtracter 35 subtracts the prediction signals $\underline{V(i, j)}$ from the image signals V(i, j) in accordance with Equation (2) to produce the first prediction error signals E(i, j).

The first prediction signals E(i, j) are quantized by the quantizer 36 into the quantized signals Q(i, j) which are delivered to the local dquantizer 41 of the local decoder 32 and the code converter 37 controlled by the coding control circuit 31, as will become clear as the description proceeds. The loca decoder 32 is operated in the above-mentioned manner to deliver the prediction signals $\underline{V(i, j)}$ to the subtracter 35 through the switch circuit 48.

On the other hand, the second, namely, intraframe coding is carried out as regards the intraframe coding split of each frame. In this case, the second local predictor 47 is connected to the subtracter 35 through the switch circuit 48 in response to the first control signal C1. As a result, the second local predictor 47 carries out intraframe prediction and cooperates with the subtracter 35 so as to produce the second prediction error signals E(i, j)' in accordance with Equation (3). The second prediction error signals E(i, j) are quantized into the quantized signals Q(i, j) by the quantizer 36 which are delivered to the code converter 37 and the local decoder 32. The local decoder 32 processes the quantized signals Q(i, j) in a known manner. Thus, the intraframe coding is interleaved with the interframe coding in the above-mentioned manner.

It is to be noted that the reverse reproduction can not be favorably made only by interleaving the intraframe coding with the interframe coding in the above-mentioned manner and by arranging the first and the second prediction error signals in the order of occurrences. This is because of no existence of a pertinent prediction error signal which serves to reproduce each of the second prediction error signals. In the illustrated example, a specific one of the first prediction error signals is used as such a pertinent prediction error signal related to each of the second prediction error signals and precedes each second prediction error signal which is derived from the intraframe coding split. The specific one of the first prediction error signals may be simply called a specific error signal hereunder. When each second prediction error signal is represented by E(i, j)', the specific error signal may be specified by E(i, j).

It should be recollected that the specific error signal E(i, j) is produced from a current image signal V(i, j) of the j-th frame and a preceding image signal V(i, j−1) of the (j−1)-th frame, as mentioned in conjunction with Equation (2). This shows that the specific error signal E(i, j) actually appears from the subtracter 35 after production of each second prediction error signal E(i, j)' from the subtracter 35. In addition, the specific error signal E(i, j) can be calculated from the previous prediction signal $\underline{V(i, j-1)}$ and the current image signal V(i, j).

Taking this into consideration, the subtracter 35 produces each second prediction error signal E(i, j)' at every frame i in accordance with Equation (3) and thereafter produces the specific error signal E(i, j). On production of the specific error signal E(i, j), the previous prediction signal $\underline{V(i, j-1)}$ is delayed through the delay circuit 52 to be supplied as a present image signal V(i, j) to the subtracter 35 through the multiplexer 51 controlled by the coding control circuit 31.

Accordingly, the subtracter 35 supplies the quantizer 36 with the first and the second prediction error signals in the order of E(i-1, j), E(i, j)', and E(i, j). The first and the second prediction error signals arranged in the above-mentioned manner are quantized by the above-mentioned manner are quantized by the quantizer 36 to be sent to the code converter 37. The illustrated code converter 37 rearranges the quantized signals Q(i, j) conveying the first and the second prediction error signals into a sequence of rearranged signals. More specifically, the rearranged signals carry the first and the second prediction error signals arranged in the order of E(i, j−1), E(i, j), and E(i, j)'. In order to establish the above-mentioned rearrangement, the code converter 37 has a plurality of delay circuits and a multiplexer circuit (not shown in this figure). After the rearrangement of the first and the second error prediction signals, the code converter 37 converts the quantized signals Q(i, j) into the coded signals of variable length codes. The coded signals have a format which is exemplified in connection with the j-th frame at a middle portion of FIG. 1. As shown in this format, a frame number j is followed by the above-mentioned rearrangement from E(O, j) to E(m, j) specified by the order of E(i−1, j), E(i, j) and E(i, j)'. At any rate, each second prediction error signal E(i, j)' is always preceded by the specific error signal E(i, j) which is matched or harmonized with each second prediction error signal E(i, j) on the reverse reproduction started from E(i, j)'.

Thus, the coded signals are recorded as the recording signals on the CD-ROM 21 with the format kept intact. Although not shown in FIG. 1, audio signals and a program data signal are also recorded together with the coded signals on the CD-ROM 21 in the known manner in accordance with the standard settled by the CCIR Recommendation 601.

Figure 3:
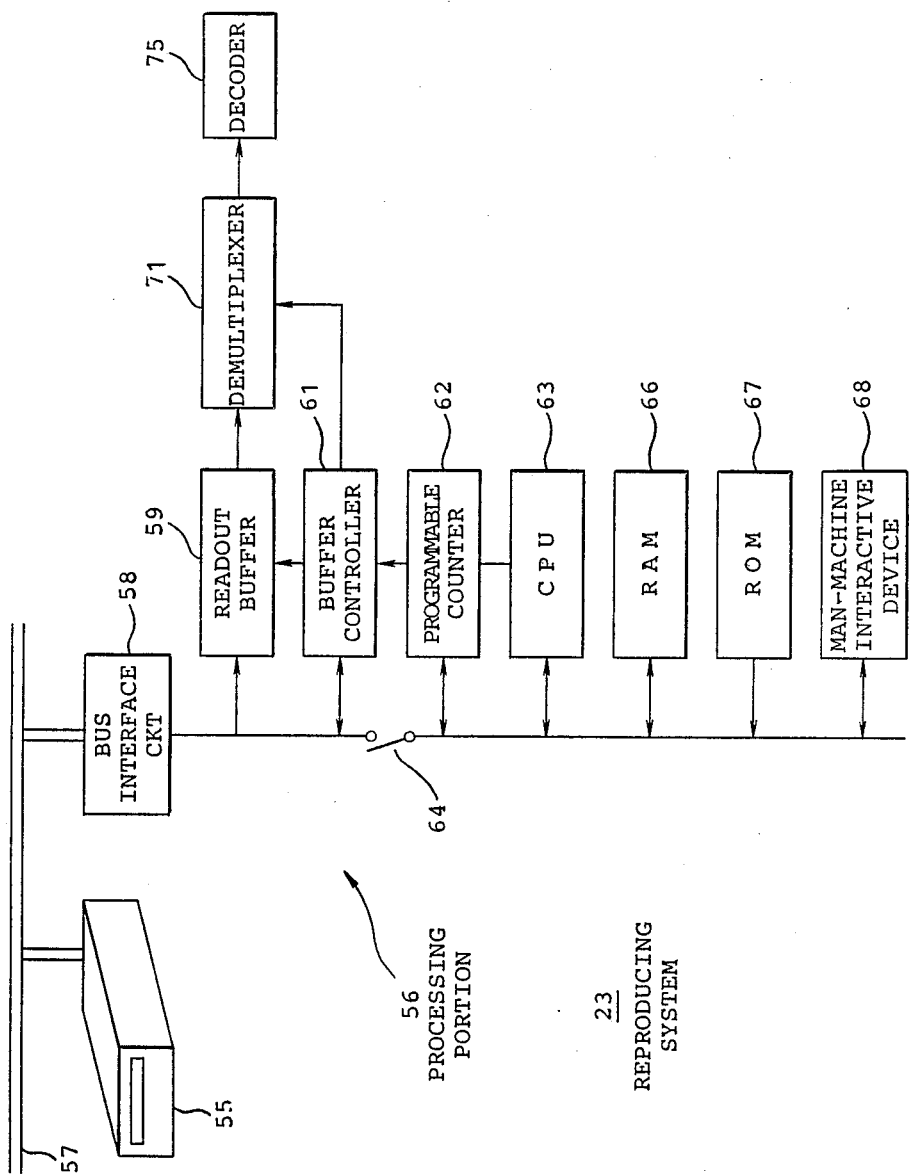
FIG. 3 is a block diagram of an image reproducing system which is applicable to the image processing system illustrated in FIG. 1.

Referring to FIg. 3 in addition to FIG. 1, the reproducing system 23 comprises a CD-ROM driver (simply referred to as a driver) 55 and a processing portion 56 connected to the driver 55 through a system interface bus 57. The driver 55 drives or rotates the CD-ROM (depicted at FIG. 1) in either a normal direction or a reverse one to read the coded or recorded signals out of the CD-ROM 21. As a result, the coded signals are derived from the CD-ROM 21 to be sent to a bus interface circuit 58 of the processing portion 56 through the system interface bus 57. In this event, the audio signal and the program data signal are also read out of the CD-ROM 21. Thereafter, the coded signals are delivered through a data line to a readout buffer 59 under control of a buffer controller 61 which is connected to the data line and which is operable in cooperation with a programmable counter 62 and a central processing unit (CPU) 63. The CPU 63 is selectively connected to the system interface bus 57 through a switch element 64 controlled by the CPU 63. In addition, the illustrated processing portion 56 comprises a random access memory (RAM) 66, a read-only memory (ROM) 67, and a man-machine interactive device 68, all of which are used for various kinds of purposes.

Now, the driver 55 and the processing portion 56 are operated under control of the CPU 63. For example, the coded signals, the audio signals, and the program data signal are sent from the driver 55 through the system interface bus 57 and the bus interface circuit 58 to be written into the readout buffer 59 in response to a write-in command which is sent from the CPU 63 through the data line with the switch element 64 closed. The coded signals, the audio signals, and the program data signal are individually stored in preassigned areas of the readout buffer 59 in accordance with an indication of the buffer controller 61, respectively. The buffer controller 61 monitors the frame number and a code length of each coded signal with a write-in address specified one by one during a write-in operation. The buffer controller 61 also distinguishes among the coded or image signals, the audio signals, and the program data signal. Moreover, the first and the second prediction error signals carried by the coded signals are also distinguished by the buffer controller 61. Such distinction between the first and the second prediction error signals is possible by monitoring the frame number and the split number in accordance with Formula (1). In the example being illustrated, the readout buffer 59 is loaded with a species signal which is indicative of either one of the first and the second prediction error signals and which may be called a coding species signal. During the above-mentioned write-in operation, the switch element 64 may be opened.

When the write-in operation is completed, the CPU 63 delivers a readout command to the buffer controller 61 through the data line with the switch element 64 closed. The buffer controller 61 successively supplies the readout buffer 59 with a readout address signal specifying each readout address of the readout buffer 59. The audio signals and the program data signal may be processed by the use of a known technique concerned with the CD-ROM. Therefore, the following description will be mainly directed to processing of the coded signals which are sent from the readout buffer 59 to a demultiplexer 71. In FIG. 3, the coded signals and the coding species signal are delivered from the demultiplexer 71 to the decoder 26.

Referring back to FIG. 1, the illustrated reproduction but also the reverse reproduction in a manner to be described later. For this purpose, the illustrated decoder 26 comprises a code inverter 76, a dequantizer 77, a delay circuit 78, a switch unit 79, an adder unit 81, a predictor unit 82, and a decode control circuit 83, all of which cooperate with one another as will become clear later. It is to be noted that the dequantizer 77 is selectively operable in a normal mode and a reverse mode under control of the decode control circuit 83. Specifically, the dequantizer 77 can produce a squence of positive dequantized signals and a sequence of negative dequantized signals in the normal and most of the reverse modes, respectively. In this connection, the dequantizer 77 can be implemented by a combination of a usual dequantizer circuit and an inverter circuit controlled by the decode control circuit 83.

On the normal reproductin, the switch unit 81 is connected direct to the dequantizer 77 under control of the decode control circuit 83. Therefore, the delay circuit 78 is not used on the normal reproduction. The dequantizer 77 is put into the normal mode by the decode control circuit 83 and therefore produces the positive dequantized signals. Under the circumstances, the coded signals are successively read out of the readout buffer 59 (FIG. 3) from the lefthand side of the format illustrated at the middle portion of FIG. 1 towards the righthand side thereof. The coded signals of the variable length codes are inversely converted by the code inverter 76 into a sequence of inverted code signals each of which is of an invariable code length. The inverted code signals are dequantized into the positive dequantized signals. In the illustrated example, the coding species signal is also read out of the readout buffer 59 to specify the second prediction error signals, such as $E(i, j)'$, and may therefore be a timing signal read out of the readout buffer 59 in synchronism with the second prediction error signals. On the normal reproduction, the second prediction error signals may be neglected and may not be reproduced, except an initial one of the second prediction error signals that appear at the first frame. Accordingly, the second prediction error signals are not dequantized by the dequantizer 77 under control of the decode control circuit 83 and are suppressed by the dequantizer 77. As a result, only the first prediction error signals carried by the coded signals are dequantized by the dequantizer 77 into the positive dequantized signals which may be reproductions of the first prediction error signals $E(i, j)$ and which are depicted at the same reference symbol.

Therefore, the positive dequantized signal $E(i, j)$ are reproduced by the adder unit 81 and the prediction unit 82 into a sequence of reproduced signals $V(i, j)$ in a known manner. Thus, the normal reproduction can be carried out.

On the reverse reproduction, the decode control circuit 83 controls the dequantizer 77 and the switch unit 79 to selectively put the dequantizer 77 into the reverse mode and to selectively connect the switch unit 79 to the delay circuit 78 in a manner to be described later. To this end, the decode control circuit 83 is supplied form the demultiplexer 71 (FIG. 3) with a reproduction mode signal representative of either the normal or the reverse reproduction and the coding species signal. Herein, let the reverse reproduction be carried out from the j-th frame which is equal to a sum of i and k, as mentioned in connection with Formula (1). In this case, it is assumed that the second prediction error signals $E(i, j)'$ is at first detected from the split shown by Formula (1) and the first prediction error signals thereafter are successively read out from the righthand side of the format illustrated in FIG. 1 towards the lefthand side. Consequently, the decoder 26 is supplied as the coded signals with the second and the first prediction error signals in the order of $E(i, j)'$, $E(i, j)$, $E(i-1, j)$, ..., $E(2, j)$, and $E(1, j)$ in the j-th frame. Each of the prediction error signals is assumed to be successively read out of the readout buffer 59 (FIG. 3) from a most significant bit to a least significant bit of each prediction error signal on the reverse reproduction.

As regards the second prediction error signal $E(i, j)'$ subjected to the intraframe coding, the dequantizer 77 is operable in the normal mode to produce the second prediction error signal $E(i, j)'$ in the form of the positive dequantized signal without any change of a polarity under control of the decode control circuit 83. On reception of the second prediction error signal E(i, j)', the switch unit 79 is connected through the delay circuit 78 to the dequantizer 77 under control of the decode control circuit 83 as illustrated in FIG. 1. Therefore, the second prediction error signal E(i, j)' is delayed by the delay circuit 78 for a single frame by the reason to be set forth later and is given to the adder unit 79 as a delayed prediction error signal. It is mentioned here that the predictor unit 82 is similar to the prediction circuit 44 of the coder 25 and therefore comprises first and second decoder predictors (not shown in this figure) similar in structure and operation to the first and the second local predictors 46 and 48 included in the coder 25, respectively. The second decoder predictor is selected by the decode control circuit 83 on reception of the second prediction error signal E(i, j)' and produces an intraframe prediction signal given by:

$$G(E(i, j)'),$$

where G is representative of an inverse prediction function of the prediction function F described in conjunction with Equation (3). Thus, the intraframe prediction signal provides a leading or first image on the reverse reproduction. From this fact, it is readily understood that the decode control circuit 82 may be similar in structure and operation to the coding control circuit 31 except that the decode control circuit 83 controls the switch unit 79 also. Each of the coding and the decode control circuits 31 and 83 may be implemented by a microprocessor.

Thereafter, the first prediction error signals, such as E(i, j), E(i−1, j), are successively dequantized into the negative dequantized signals (as symbolized at −E) by the dequantizer 77 with the reverse mode indicated by the decode control circuit 83. On reception of the negative dequantized signals, the switch unit 79 connects the dequantizer 77 to the adder unit 81 with the delay circuit 78 disconnected from the dequantizer 77. Thus, the negative dequantized signals are directly sent through the switch unit 79 to the adder unit 81 without a delay equal to a single frame interval. In other words, only the second prediction error signals are delayed by the delay circuit 78. This is because each first prediction error signal E(i, j) is derived with reference to both preceding and current frames and a time difference therefore exists between the first and the second prediction error signals E(i, j) and E(i, j)' for the single frame interval. In order to adjust or match such a time difference between the first and the second prediction error signals to each other, each second prediction error signal must be delayed on the reverse reproduction, as mentioned above. As a result, the negative dequantized signals for the first prediction error signals E(i, j) are successively processed by the adder unit 81 and the predictor unit 82.

Let E(i, j) be given in the form of −E(i, j) to the adder unit 81 during production of the intraframe prediction signal G(E(i, j)'). In this event, the adder unit 81 calculates G(E(i, j)')−E(i, j), namely, V(i, j−1) to produce to second one of the reproduced signals. Subsequently, the second decoder predictor is switched to the first decoder predictor in the predictor unit 82 to successively produce a sequence of interframe predictive signals representative of results of the interframe prediction. Accordingly, the second reproduced signal V(i, j−1) is followed by the reproduced signals depicted at V(i−1, j−1), V(i, j−1) to produce a second one of the reproduced signals. Subsequently, the second decoder predictor is switched to the first decoder predictor in the predictor unit 82 to succesively produce a sequence of interframe predictive signals representative of results of the interframe prediction. Accordingly, the second reproduced signal V(i, j−1) is followed by the reproduced signals depicted at V(i−1, j−1), V(i−2, j−1), . . ., V(1, j−1). Similar operation is carried out in previous frames so as to enable the reverse reproduction.

At any rate, the illustrated recording system records on the CD-ROM 21 the second prediction error signal E(i, j)' which is indispensable for the reverse reproduction to reproduce a first image and which therefore may be called an essential error signal. On the reverse reproduction, the reproducing system reproduces the first image with reference to the essential error signal and thereafter the following images by successively subtracting the first prediction error signals from the intraframe prediction signal.

In the illustrated example, the essential error signal, namely, the second prediction error signal is interspersed at every frame. With this structure, the reverse reproduction of a succession of moving images can be carried out from whichever one of the frames. In other words, the reverse reproduction is possible even on no reproductin of the last frame or scene of the moving images.

Figure 4:
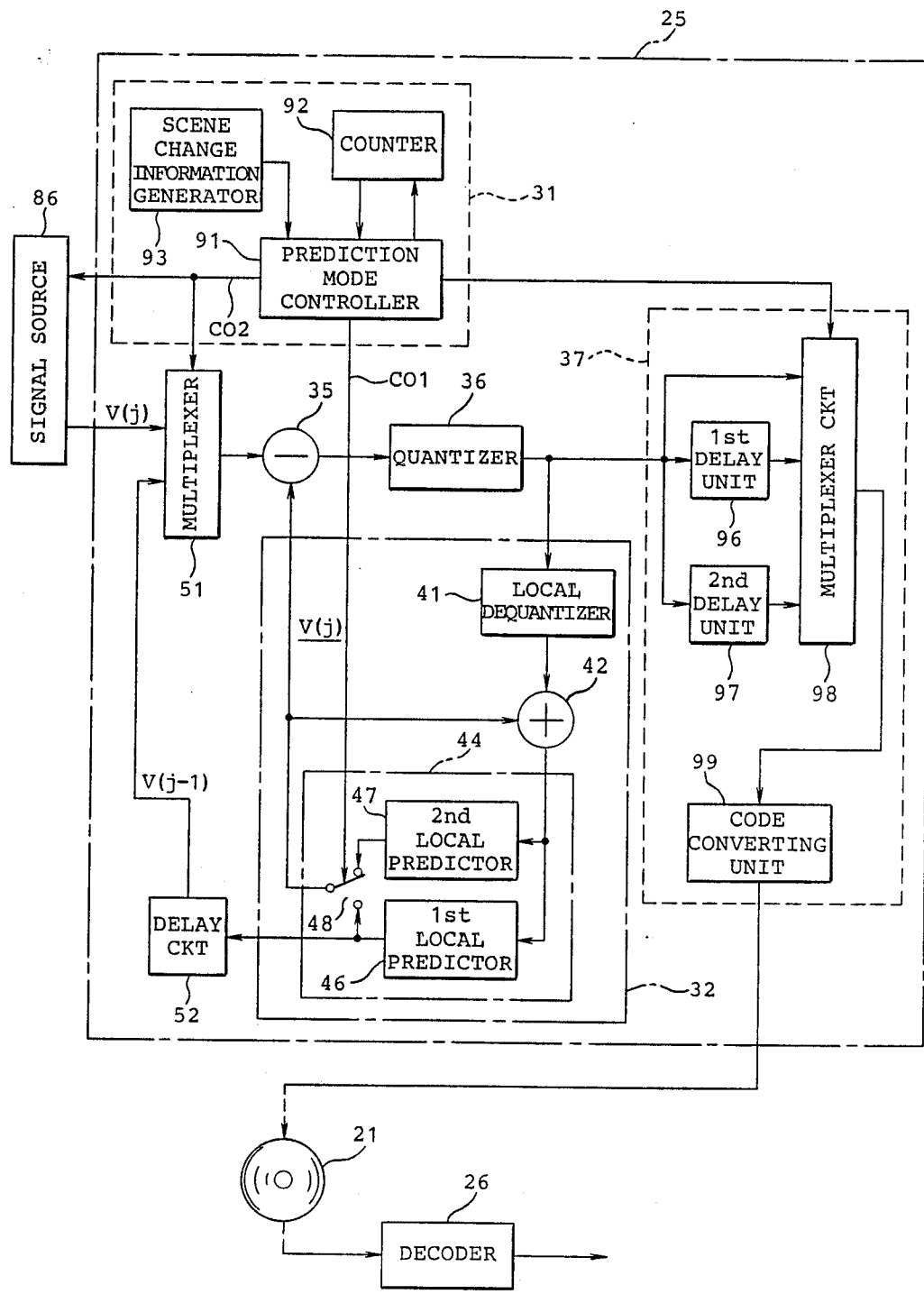
FIG. 4 is a block diagram of an image processing system according to a second embodiment of this invention.
Figure 5:
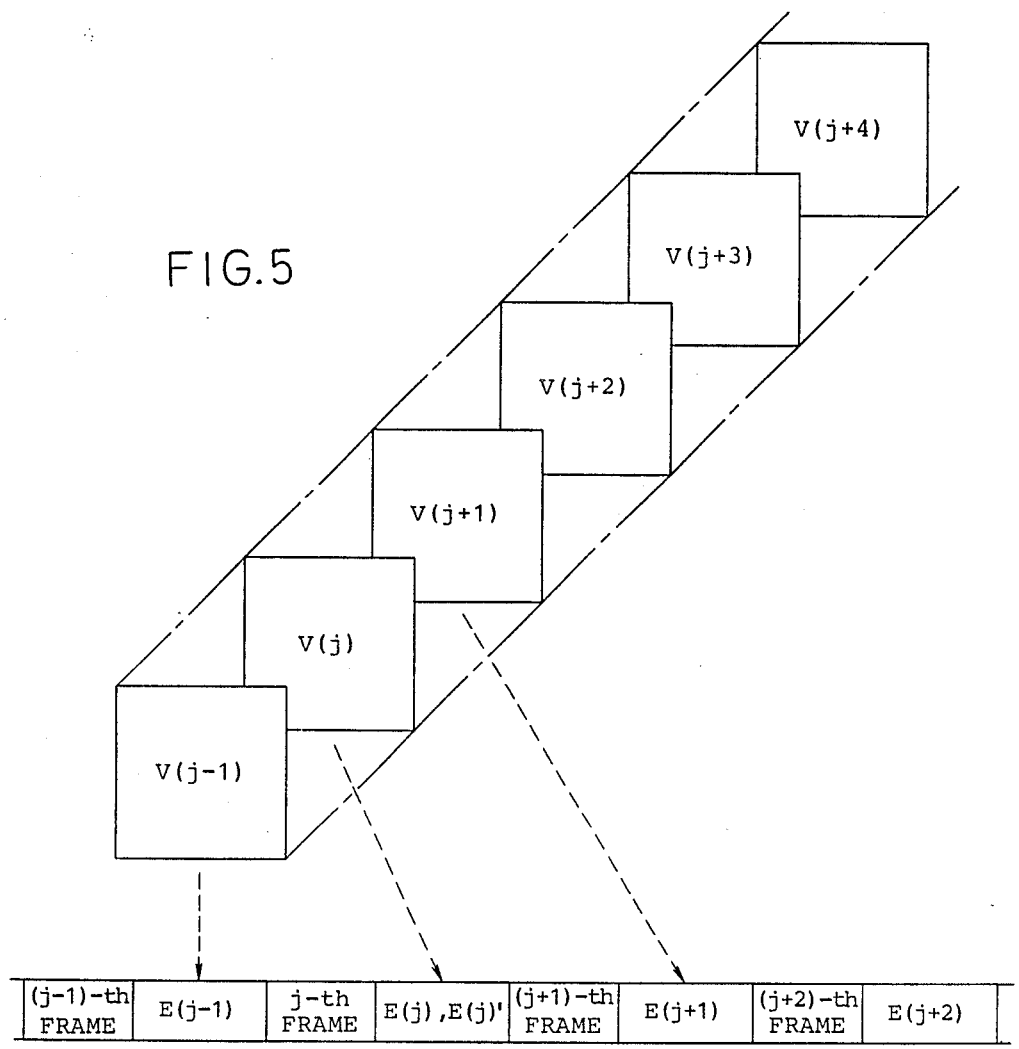
FIG. 5 shows a relationship between a seccession of frames and a signal format to describe an operation of the image processing system illustrated in FIG. 4.

Referring to FIGs. 4 and 5, an image processing system according to a second embodiment of this invention is similar in structure and operation to that illustrated in FIG. 1 except that the intraframe coding is interleaved in FIG. 4 with the interframe coding at a predetermined interval of time in consideration of a scene change which results in discontinuity of a succession of moving images or scenes. Specifically, the image processing system illustrated in FIG. 4 is different from the system of FIG. 1 wherein the intraframe coding is carried out one at a frame in FIG. 1. To this end, a sequence of image signals for the image signals is divided into a plurality of scenes each of which is composed of frame images V(j−1), V(j), V(j+1), V(j+2), . . . placed at the respective frames j−1, j, j+1, j+2, . . . , as shown in FIG. 5 and is subjected in FIG. 4 to the interframe coding and the intraframe coding at every frame without separating each frame into a plurality of splits. For brevity of description, the image signals are depicted at the same symbols as the frame images. In FIG. 4, the illustrated image processing system comprises a coder 25 which can be specified by a coding control circuit 31 and a code converter 37 so as to control a switching timing or time instant for switching between the interframe coding and the intraframe coding and to thereby provide a format illustrated at the bottom of FIG. 5.

The coder 25 is operable in cooperation with a signal source 86 for producing the image signals represented by V(j). The illustrated signal source 86 can interrupt production of the image signals V(j) in a manner to be described later. The image signal V(j) are delivered through the multiplexer 51 to the subtracter 35 which is supplied from the local decoder 32 with a sequence of prediction signals V(j) in a manner similar to that illustrated in FIG. 1 under control of the coding control circuit 31. The illustrated coding control circuit 31 comprises a prediction mode controller 91, a counter 92 coupled to the prediction mode controller 91, and a scene change information generator 93 for supplying scene change information to the prediction mode controller 91.

The prediction mode controller 91 serves to switch between the interframe coding and the intraframe coding by cooperating with the counter 92 and the scene change information generator 93, as will become clear as the description proceeds.

With this structure, the counter 92 is set to a preselected value or count T after the intraframe coding is carried out in the coder 25 in accordance with an indication of the prediction mode controller 91. As long as the scene change information generator 93 does not produce the scene change information, the counter 92 is successively counted down from the preselected value one by one in response to each of internal clock pulses produced within the counter 92. The prediction mode controller 91 monitors the counter 92 and switches from the interframe coding to the intraframe coding each time when a count of the counter 92 becomes equal to zero. Thus, the intraframe coding is interleaved with the interframe coding at a time interval of, for example, 5 seconds determined by the preselected value and the internal clock pulses, if the scene change information is not given from the scene change information generator 93.

On the other hand, when the scene change information is supplied from the scene change information generator 93 to the prediction mode controller 91, the intraframe coding is forcibly indicated by the prediction mode controller 91. Simultaneously, the counter 92 is forcibly reset to zero to indicate the intraframe coding and thereafter set to the predetermined value again under control of the prediction mode controller 91. Subsequently, the counter 92 is counted down from the predetermined value again.

At any rate, the intraframe coding is repeatedly carried out at every duration shorter than the time interval even when the scene change information is produced by the scene change information generator 93.

More particularly, the intraframe coding is assumed to be carried out about the image signals V(j) of the j-th frame, as shown in FIG. 5. In this event, the second local predictor 47 is selected by the switch element 48 in the prediction circuit 44, as mentioned in FIG. 4. For this purpose, the prediction controller 91 delivers a first control signal CO1 to the switch element 48 to connect the second local predictor 47 to the subtracter 35. On the intraframe prediction, the local decoder 32 carries out a calculation of intraframe prediction in accordance with an intraframe prediction function F. A result of the above-mentioned calculation may be represented by F(V(j)) and appears as an output signal from the adder 42, where j is representative of a frame number. The output signal of the adder 42 is delivered to both the first and the second local predictors 46 and 47 to individually carry out the interframe prediction and the intraframe prediction with the first local predictor 46 disconnected from the subtracter 35. The result F(V(j)) of the intraframe prediction calculation is locally decoded into an intraframe prediction signal by the second local predictor 47 operable by a function G which is an inverse function of F. Accordingly, an intraframe prediction error signal depicted at E(j)' is produced as the prediction error signals by the subtracter 35 and is given to the code converter 37 and the local decoder 32. During the intraframe prediction, the first local predictor 46 also carries out intraframe prediction calculation to supply the delay circuit 52 with each interframe prediction signal which may be depicted at V(j) and which is delayed for a single frame period, as mentioned in conjunction with FIG. 1.

After production of the intraframe prediction error signal, the prediction mode controller 91 sends a second control signal CO2 to the signal source 86 and the multiplexer 51. The signal source 86 interrupts production of the image signals for a single frame duration while the multiplexer 51 selects an output signal of the delay circuit 52. Inasmuch as the delay circuit 52 delays the interframe prediction signal for a single frame, as described before, the output signal of the delay circuit 52 may be represented by V(j−1). Consequently, the subtracter 35 carries out a calculation given by:

$$G(E(j)') - V(j-1), \qquad (4)$$

and produces an interframe prediction error signal E(j) defined by Formula (4). When the interframe prediction error signal E(j) is calculated by the subtracter 35, the prediction mode controller 91 delivers the second control signal CO2 to the signal source 86 and the multiplexer 51 again. Responsive to the second control signal CO2, the signal source 86 releases the interruption of the image signals to restart production of the image signals. On the other hand, the multiplexer 51 is switched to select the image signals in response to the second control signal CO2. Simultaneously, the first control signal CO1 is also delivered from the prediction mode controller 91 to the switch element 48 to connect the first local predictor 46 to the subtracter 35. Under the circumstances, the following interframe prediction error signal E(j+1) is sent from the subtracter 35 to the quantizer 36. Subsequently, the interframe prediction error signals are successively calculated by the subtracter 35 in a similar manner.

As described before, the prediction error signals are sent through the quantizer 36 to the code converter 37 in the order of E(j)', E(j), and E(j+1) on processing the image signals V(j) of the j-th frame. Such an order of the prediction error signals is not helpful for the reverse reproduction, as already pointed out in conjuction with FIG. 1 and is therefore rearranged by the code converter 37.

Specifically, the illustrated code converter 37 comprises first and second delay units 96 and 97 having first and second delay times equal to a single frame duration and two frame durations, respectively. In addition, the code converter 37 further comprises a multiplex circuit 98 connected to the quantizer 36 and the first and the second delay units 96 and 97 and a code converting unit 99. The multiplex circuit 98 is controlled by the prediction mode controller 91 in a manner to be presently described.

When the interframe coding is switched to the intraframe coding, the intraframe prediction error signal E(j)' is supplied to the multiplex circuit 98 through the second delay unit 97 to delay the intraframe prediction error signal E(j)' for two frame durations. Subsequently, when the intraframe coding is switched to the interframe coding, the multiplex circuit 98 allows the interframe prediction error signal E(j) to pass therethrough without any delay. Thereafter, the multiplex circuit 98 is switched to receive the following interframe prediction error signal E(j+1) through the first delay unit 96 when the interframe coding is carried out in a usual manner.

From this fact, it is readily understood that the prediction error signals are rearranged into E(j), E(j)', and E(j+1), as illustrated in FIG. 5 and sent to the code converting unit 99. The code converting unit 99 converts the prediction error signals in the above-mentioned order into the recording signals each of which is formed by a variable length code with a frame number attached to each variable length code, as illustrated at the bottom portion of FIG. 5.

The recording signals are recorded on the CD-ROM 21 in the manner illustrated in FIG. 1 and are reproduced into the reproduced signals V(j) by a reproducing system specified by a decoder 26 in a manner similar to that illustrated in FIGS. 1 and 3. The decoder 26 may be similar to that illustrated in FIG. 1 except for a switching time instant for switching the dequantizer 77, the switch unit 79, and the prediction unit 82. Therefore, description will not be made about the decoder 26 any longer.

At any rate, it is possible to realize not only the reverse reproduction but also a quick search for searching for only the intraframe prediction error signals on the normal reproduction. In other words, an initial image can be reproduced by searching for the intraframe prediction error signals interspersed among the interframe prediction error signals. This means that the images can be reproduced from an intermediate image between a leading image and a trailing image.

Figure 6:
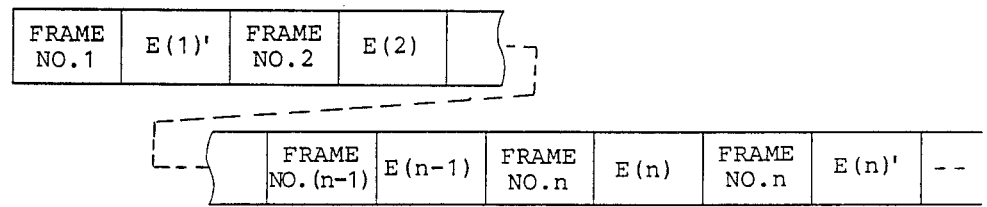
FIG. 6 shows another signal format for use in describing an image processing system according to a third embodiment of this invention.
Figure 7:
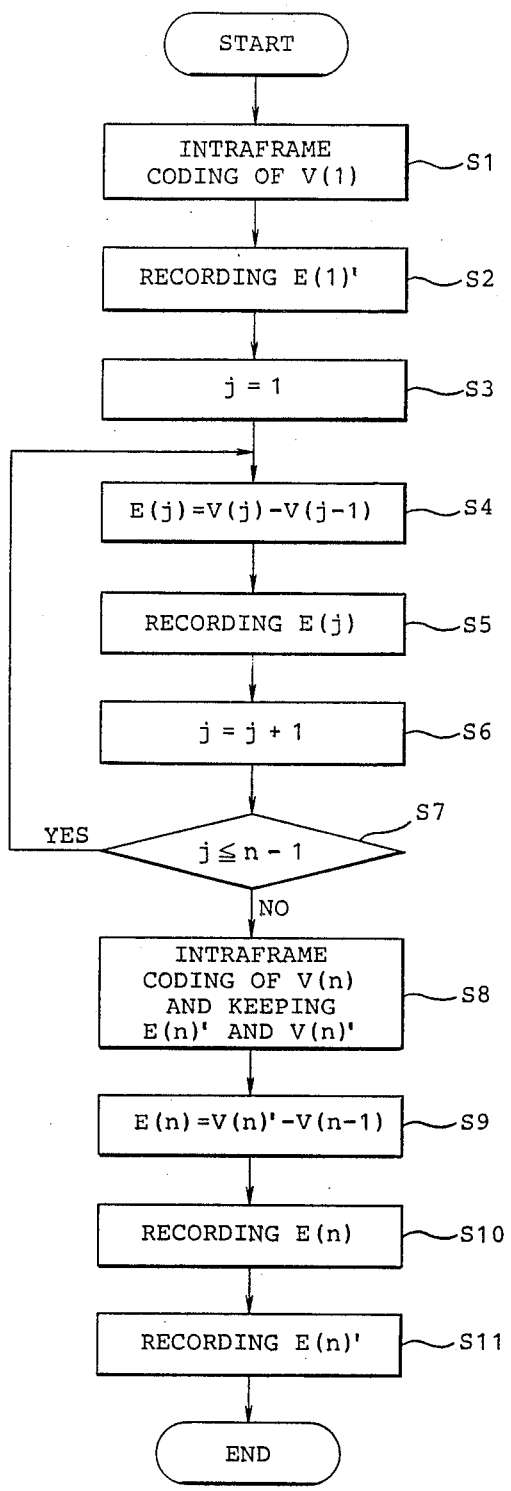
FIG. 7 is a flow chart for use in describing an operation of the image processing system according to the third embodiment of this invention.

Referring to FIGS. 6 and 7 together with FIG. 1, an image processing system according to a third embodiment of this invention is for use in recording a succession of image signals to carry out a reverse reproduction. The image signals are divided into a plurality of scenes each of which is composed of a plurality of frames and which is specified by a leading image signal and a trailing image signal. The reverse reproduction can be carried out at every scene from each trailing image signal. In the illustrated example, the leading and the trailing image signals are assumed to form a leading and a trailing frame depicted at zero and n, respectively. In this connection, the leading and the trailing image signals may be depicted at V(0) and V(n), respectively. It is to be noted that each frame is not divided into a plurality of splits and processing is therefore carried out at every frame like in FIG. 4.

The image processing system according to the third embodiment is specified by a signal format, as shown in FIG. 6. Specifically, the leading image signal V(1) of the leading frame 1 is subjected to the intraframe coding, as symbolized by a leading intraframe prediction error signal E(1)′, like in FIGS. 1 and 4, although not explicitly described in conjunction with FIGS. 1 and 4. The leading intraframe prediction error signal E(1)′ may be called a leading prediction error signal and serves to reproduce the leading image, as known in the art. Thereafter, the image signals V(2) through V(n−1) of the first through (n−1)-th frames are subjected to the interframe coding to be coded into first through (n−1)-th interframe prediction error signals E(1) to E(n−1), respectively.

It is to be noted that the (n−1)-th interframe prediction error signal E(n−1) is followed by an n-th interframe prediction error signal E(n) which is produced by the interframe coding and that a trailing intraframe prediction error signal E(n)′ follows the n-th interframe prediction error signal E(n) as a result of the intraframe coding of the trailing image signal V(n). The trailing intraframe prediction error signal E(n)′ is helpful to form an initial image on the reverse reproduction from the trailing image.

It is readily understood that the signal format illustrated in FIG. 6 can be recorded on the CD-ROM 21 and reproduced therefrom in a manner similar to that illustrated in FIG. 1 by changing the switching time instant between the intraframe coding and the interframe coding. Therefore, only recording procedures will be described with reference to FIG. 7.

In FIG. 7, the recording procedures are started and followed by a first step S1 at which the leading image V(1) is subjected to the intraframe coding. As a result, the leading intraframe prediction error signal E(1)′ is produced and recorded on the CD-ROM 21, as shown at a second step S2. Subsequently, the second step S2 proceeds to a third step S3 at which the frame number j is set to unity. Thereafter, the interframe prediction error signal E(j) is successively produced at a fourth step S4 and is recorded on the CD-ROM 21 at a fifth step S5. This shows that the interframe coding is made at the fourth step S4 in accordance with the following equation given by:

$$E(j) = V(j) - V(j)$$
$$= V(j) - V(j-1).$$

Such interframe coding is continuously carried out from the first frame to the (n−1)-th frame with the frame number j counted up into j+1 at a sixth step S6.

At a seventh step S7, it is judged whether or not the frame number j is not greater than (n−1). Such judgement is made by the coding control circuit 31 (FIG. 1). The fourth through seventh steps S4 through S7 are repeated as long as the frame number j does not exceed (n−1).

When the frame number j exceeds (n−1), namely, is equal to n, the seventh step S7 is followed by an eighth step S8. At the eighth step S8, the trailing image signal V(n) is subjected to the intraframe coding into the trailing intraframe prediction error signal E(n)′ which is locally decoded into a local decoded signal V(n)′. The trailing intraframe prediction error signal E(n)′ and its local decoded signal V(n)′ may be kept or stored in the coder 25 and may be delayed in the manner described in conjunction with FIG. 4. Thereafter, the eighth step S8 proceeds to a ninth step S9 at which a difference between V(n)′ and V(n−1) is calculated by the subtracter 35 and is produced as the trailing interframe prediction error signal E(n). The trailing interframe prediction error signal E(n) is at first recorded on the CD-ROM 21 at a tenth step S10. After recording E(n), the trailing intraframe prediction error signal E(n)′ is recorded on the CD-ROM 21 at an eleventh step S11. Thus, the recording procedures are finished.

The normal and the reverse reproductions can be carried out from the leading and the trailing image signals in the illustrated example, respectively. On the normal reproduction, the leading intraframe prediction error signal E(1)′ is locally decoded into an intraframe decoded signal represented by G(E(1)′), where G is representative of the inverse function of F, as mentioned in conjunction with FIG. 4. Such an intraframe decoded signal appears as a reproduction of the leading image signal V(1). Thereafter, the first through n-th interframe prediction error signals are successively reproduced in the known manner.

On the reverse reproduction, the trailing intraframe prediction error signal E(n)′ is at first subjected to intraframe decoding into a trailing intraframe decoded signal G(E(n)') without a negative sign in a manner similar to that illustrated in FIG. 1. Thereafter, the interframe prediction error signals are decoded into interframe decoded signal with the negative sign attached thereto, as mentioned in FIG. 1.

Figure 8:
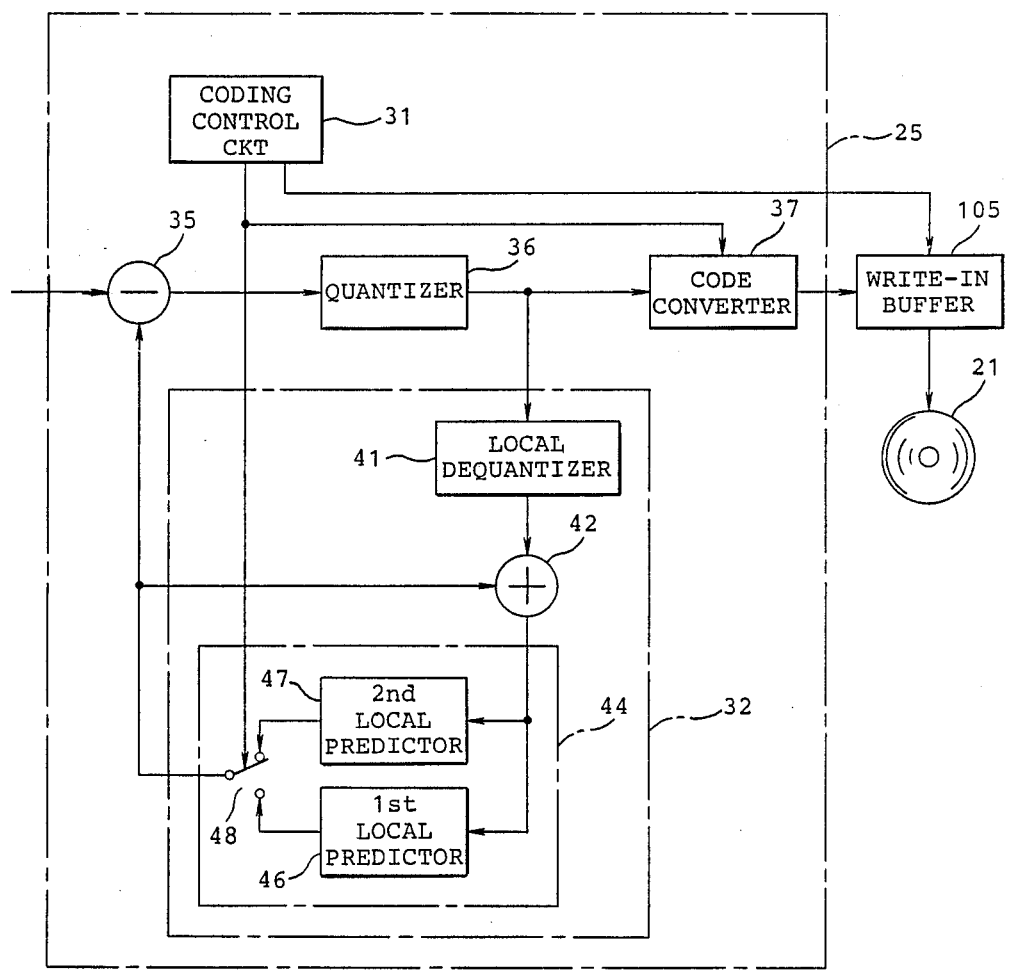
FIG. 8 is a block diagram of an image processing system according to a fourth embodiment of this invention.

Referring to FIG. 8, an image processing system according to a fourth embodiment of this invention comprises similar parts designated by like reference numerals and symbols. The illustrated image processing system is useful for recording not only a succession of image signals but also an index signal which will become clear later and which is attached to each image signal. The image signals may be coded by a coder 25 into a sequence of coded signals which carry intraframe and interframe prediction error signals. The illustrated coder 25 is operable in the manner mentioned in conjunction with one of FIGS. 1, 4, and 7 and may comprise a coding control circuit 31 similar to that shown in FIG. 1 or FIG. 4 except that the index signal is produced from the illustrated coding control circuit 31. The index signal is representative of a selected one of a frame number which carries the intraframe prediction error signal, a location of the intraframe prediction error signal, and a split thereof. Such a frame number, a location, and a split are indicated in the form of an address signal and can be produced by counting the frame number or the like in the coding control circuit 31 in a known manner. In this event, each index signal may be produced at every one of scenes when each scene lasts for comparatively long time and may specify a leading or head portion at which the intraframe prediction error signal is placed in each scene. In any event, the index signal may be made to correspond to a time instant at which the intraframe prediction error signal appears.

In FIG. 8, the intraframe and the interframe prediction error signals are successively quantized by the quantizer 36 into the quantized signals in cooperation with the local decoder 32 which may be similar in structure and operation to those illustrated in FIGS. 1 and 4. The quantized signals are rearranged in the code converter 37 in the manner mentioned in conjunction with FIGS. 1 and 4 and are converted into a sequence of coded signals each of which is of a variable length code. The coded signals are sent to a write-in buffer 105 which is supplied from the coding control circuit 31 with the index signal. The write-in buffer 105 may be an erasable memory having a plurality of recording channels and may therefore be a recording medium, such as a magnetic tape. The index signal and the intraframe and the interframe prediction error signals are memorized on different channels of the write-in buffer 105.

Figure 9:
FIG. 9 shows a signal format for use in the image processing system illustrated in FIG. 8.

Referring to FIG. 9 together with FIG. 8, the index signal and the intraframe and the interframe prediction error signals are read out of the write-in buffer 105 in accordance with a format illustrated in FIG. 9. Specifically, the index signal precedes a data signal, such as the intraframe and/or the interframe prediction error signals. In the illustrated format, a header is placed between the index and the data signals to indicate a length of each scene or a data species representative of, for example, either one of the intraframe or the interframe prediction error signals.

The index signal is successively memorized on a specific area of the CD-ROM 21 which may be a directory area predetermined on the CD-ROM 21 to record a file name, a file size, a source, and the like.

On reproducing the images from the CD-ROM 21, it is possible to read the index signal out of the specific area of the CD-ROM 21 and to detect the time instant or location for each intraframe prediction error signal. Consequently, each intraframe prediction error signal is quickly accessed and read out. This shows that the index signal memorized on the CD-ROM 21 is helpful for a jump reproduction such that a part of the images is omitted or skipped during a reproduction of moving images. Specifically, the index signal serves to indicate a destined address to be skipped and to also specify an intraframe prediction error signal memorized at the destined address in response to a request of the jump reproduction. This means that it is possible to start a reproduction at the specified intraframe prediction error signal within a minimum time. In addition to the jump reproduction, a skip reproduction can also be carried out with reference to the index signal by automatically and continuously skipping by a predetermined amount of frames.

Figures 10, 11:
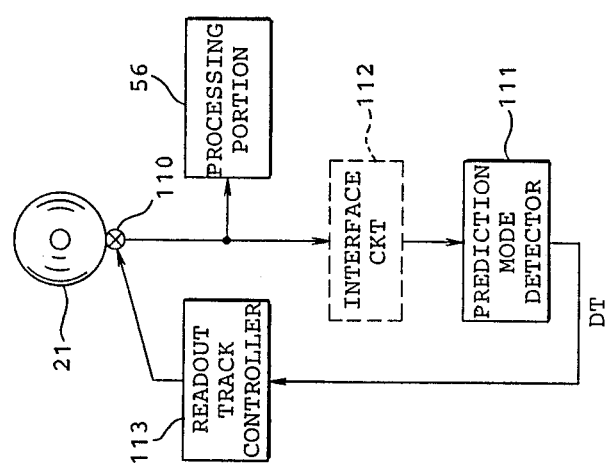
FIG. 10 is a block diagram of an image processing system according to a fifth embodiment of this invention.
FIG. 11 shows a signal format used in the image processing system illustrated in FIG. 10.

Referring to FIGS. 10 and 11, an image processing system according to a fifth embodiment of this invention is for use in reproducing a sequence of moving images from a CD-ROM 21. It is assumed that a signal format illustrated in FIG. 11 is used to record the moving images on the CD-ROM 21. Each moving image is subjected to intraframe coding and interframe coding. In FIG. 11, the signal format is formed at every one of scenes each of which is composed of a plurality of frames arranged from a leading or first frame to a trailing or n-th frame. The intraframe coding and the interframe coding are carried out at every scene to produce intraframe and interframe prediction error signals (depicted at E' and E, respectively) in a manner mentioned in connection with FIG. 7. From this fact, it is readily understood that the leading and the trailing frames of each scene are subjected to the intraframe coding while the second through trailing frames of each scene are subjected to the interframe coding. In addition, the intraframe and the interframe prediction error signals of the trailing frame are rearranged in the manner described in conjunction with FIG. 7. The illustrated signal format is related to an i-th scene and an (i+1)-th scene which are specified by a first suffix of each prediction error signal, such as E' and E. A second suffix of each prediction error signal is representative of a frame number.

The illustrated signal format has a scene header SH representative of a scene number and a data header DH representative of whether a following prediction error signal is the intraframe or the interframe prediction error signal. Thus, the data header represents a data species of a following prediction error signal. As shown in FIG. 11, the signal format for each scene comprises the scene header SH at a leading portion of the signal format and the intraframe and the interframe prediction error signals E(i, 1)', E(i, 2), E(i, 3), . . . , E(i, n), E(i, n)' which are preceded by the respective data headers DH. The trailing intraframe prediction error signal E(i, n)' is followed by a vacant area VA preceding the next following scene header SH of the (i+1)-th scene. It is to be noted that no index signal is included in the signal format illustrated in FIG. 11.

In FIG. 10, a readout operation is successively carried out from the CD-ROM 21 by the use of a pickup head 110 placed within the driver 55 (FIG. 3). As a result, a sequence of readout signals is successively sent from the pickup head 110 to a processing portion 56 which may be similar to that illustrated in FIG. 3 and which comprises a readout buffer 59 and a decoder 26. The readout signals carry various kinds of signals mentioned in conjunction with FIG. 11 and are sent to a prediction mode detector 111 directly or through an interface circuit 112 depicted at a broken line block in FIG. 10. The prediction mode detector 111 monitors each data header DH placed before the intraframe and the interframe prediction error signal E' and E (suffixes omitted) to produce a detection signal DT representative of detection of each intraframe prediction error signal E'. The detection signal DT is supplied to a readout track controller 113 to drive the pickup head 110. Consequently, the pickup head 110 is placed on the corresponding intraframe prediction error signal E'. This shows that each intraframe prediction error signal E' alone is read out of the CD-ROM 21 only when the data header DH indicates each intraframe prediction error signal while the interframe prediction error signals E are skipped on no production of the detection signal DT without being read out of the CD-ROM 21.

In FIG. 10, a closed loop is formed by the pickup head 110, the prediction mode detector 111, and the readout track controller 113 to successively read each intraframe prediction error signal E with interframe prediction error signals neglected and to quickly jump to a following intraframe prediction error signal. In this event, only the intraframe prediction error signals are reproduced in the processing portion 56. Accordingly, a high speed reproduction can be achieved by selectively reproducing intraframe prediction error signals or by watching only important scenes which are being skipped. The interface circuit 112 serves to preliminarily process the readout signals before they are supplied to the prediction mode detector 111. The interface circuit 112 may be a decoder or so. At any rate, such a high speed reproduction enables a reduction of redundancy accompanied by a reproduction of moving images.

When the intraframe coding is carried out in the manner described with reference to FIG. 4 even when a scene change occurs, a high speed reproduction can be carried out without loss of important information which might appear on occurrence of the scene change. Therefore, entirety of images can quickly be monitored for a short time even when the images are recorded for a long time.

The above-mentioned high speed reproduction or quick search may be made in either a normal direction or a reverse direction of the CD-ROM 21. From this fact, it is seen that the reverse reproduction is also possible as well as the normal reproduction by the use of the processing portion 56.

Figures 12, 13:
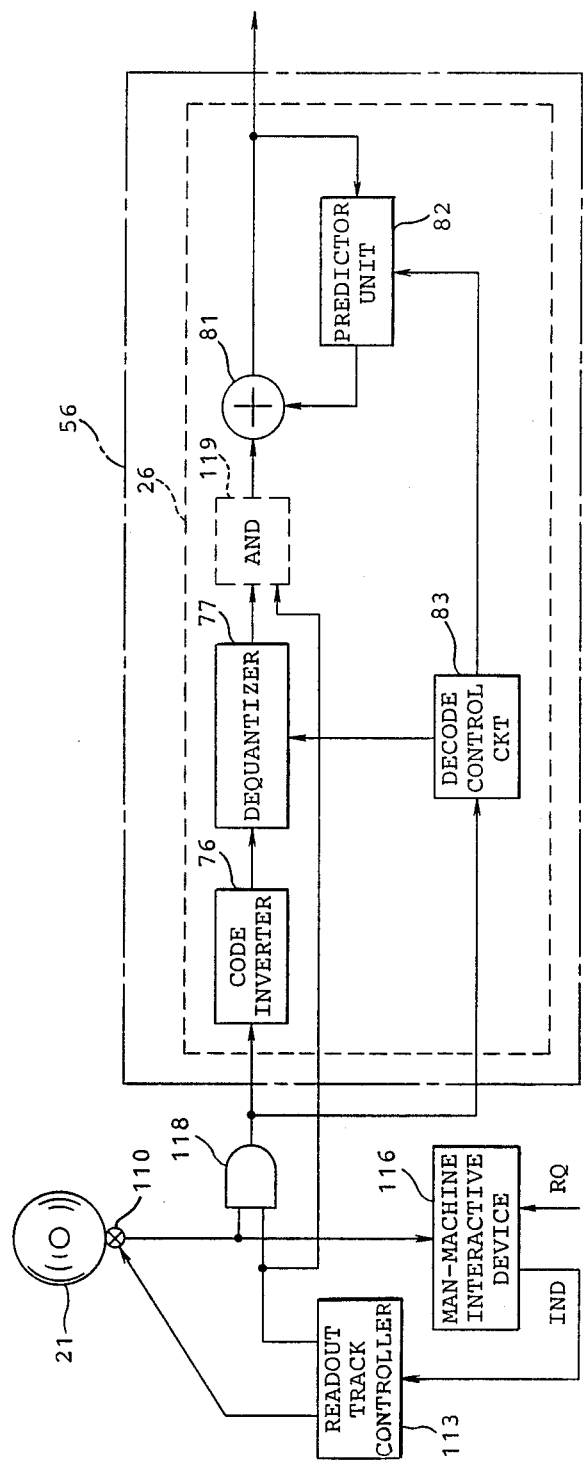
FIG. 12 is a block diagram of an image processing system according to a sixth embodiment of this invention.
FIG. 13 shows a signal format used in the image processing system illustrated in FIG. 12.

Referring to FIGS. 12 and 13, an image processing system according to a sixth embodiment of this invention is for use in reproducing a sequence of moving images from the CD-ROM 21, like in FIG. 10. The illustrated system records, on a CD-ROM 21, a sequence of recording signals having a signal format illustrated in FIG. 13. The signal format shown in FIG. 13 is similar to that illustrated in FIG. 11 except that a scene header SH is preceded by an index signal, as shown in FIG. 9. The index signal is indicative of a location of a scene or a scene number and may be produced in the manner described with reference to FIG. 8. Thus, the recording signals is divisible into a succession of numbered scenes each of which is composed of a plurality of frames numbered from zero to n. In this event, the index signal may be recorded on a directory area of the CD-ROM 21.

In FIG. 12, the image reproducing system comprises a man-machine interactive device 116 responsive to a request RQ issued from an operator or speaker. The illustrated request RQ includes a desired one of the scene numbers and/or a reproduction mode representative of a normal reproduction, a reverse reproduction, a quick search, or the like. Responsive to the request RQ, the man-machine interactive device 116 supplies a readout track controller 113 with an indication signal IND indicative of the desired scene number or the reproduction mode. The readout track controller 113 guides the pickup head 110 from a recording track to a desired track. The pickup head 110 picks up the readout signals from the desired track of the CD-ROM 21. The readout signals are sent to an AND gate 118 connected to the readout track controller 113. The illustrated readout track controller 113 produce a logic "1" level signal when the pickup head 110 is moved to a reproduction start position, namely, the desired scene or so, to open the AND gate 118. Consequently, the readout signals are sent to the processing portion 56 after the pickup head 110 is located at the reproduction start position.

Let the operator indicate a reproduction start position in the form of a scene number. In this event, the readout track controller 113 moves the pickup head 110 to the reproduction start position in response to the indication signal IND sent from the man-machine interactive device 116. However, the man-machine interactive device 116 does not immediately issue a readout indication to the pickup head 110 after the pickup head 110 is located at the reproduction start position. Instead, the man-machine interactive device 116 judges whether each readout signal is an intraframe or an interframe prediction error signal by monitoring each data header DH, as shown in FIG. 13, included in the readout signals.

If a certain intraframe prediction error signal is memorized at the reproduction start position, the man-machine interactive device 116 delivers a reproduction start indication to the readout track controller 113 to make the same supply the logic "1" level signal to the AND gate 118.

Unless such an intraframe prediction error signal is memorized at the reproduction start position, the man-machine interactive device 116 supplies the readout track controller 113 with a specific indication to move the pickup head to a position which is nearest along a direction of a normal reproduction to the reproduction start position and at which an intraframe prediction error signal. As a result, the pickup head 110 is moved to the above-mentioned position, detecting only the data headers DH. During movement of the pickup head 110, the processing portion 56 is not supplied with the readout signals because the readout track controller 113 does not deliver the logic "1" level signal to the AND gate 118. This shows that it is possible to avoid a reduction of an image quality, which might result from a reproduction of a nonsignificant interframe prediction error signal. Thus, it is possible to reproduce an intraframe prediction error signal nearest to the reproduction start position even when no intraframe prediction error signal is memorized at the reproduction start position. Therefore, an actual reproduction of image signals is started as quickly as possible.

In FIG. 12, the processing portion 56 is specified by a decoder 26 which is similar in structure to that illustrated in FIG. 1, although the delay circuit 78 and the switch element 79 are omitted from the decoder 26 of FIG. 12. The AND gate 118 may be placed between the dequantizer 77 and the adder 81, as symbolized at a broken line block 119.

Figure 14:
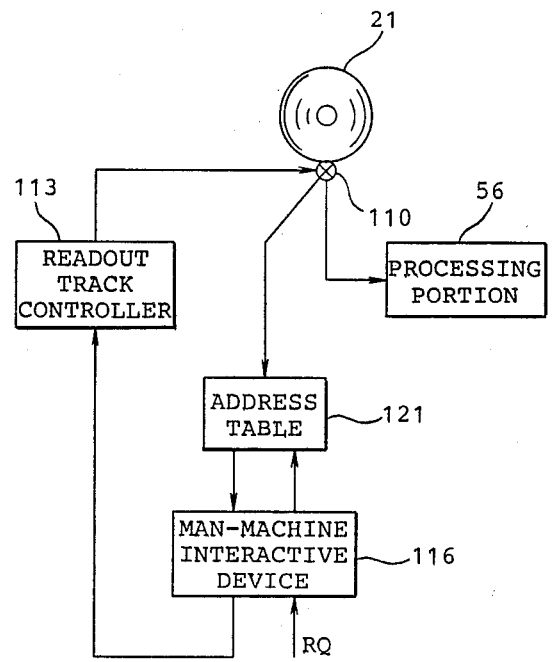
FIG. 14 is a block diagram of an image processing system according to a seventh embodiment of this invention.

Referring to FIG. 14, an image processing system according to a seventh embodiment of this invention is similar in structure and operation to that illustrated in FIG. 12 except that an address table 121 is intermediate between the man-machine interactive device 116 and the pickup head 110 in FIG. 14 and the AND gate 118 of FIG. 12 is omitted from FIG. 14. In this event, it is assumed that the illustrated CD-ROM 21 has a directory area which memorizes a succession of intraframe signal positions which are loaded with the intraframe prediction error signals. In the example being illustrated, the intraframe signal positions are stored in the address table 121. With this structure, a reproduction start position is sent from the man-machine interactive device 116 to the address table 121 in response to a request RQ issued from an operator. In this case, the address table 121 informs the man-machine interactive device 116 of one of the intraframe signal positions that is nearest to the reproduction start position. Therefore, the nearest position is indicated from the man-machine interactive device 116 to the readout track controller 113 to move the pickup head 110 to the nearest position. Therefore, it is possible with the above-mentioned embodiment to derive an intraframe prediction error signal from the nearest position within a minimum time.

Such a nearest position may be placed after or before the reproduction start position by selecting a position nearer to the reproduction start position. This serves to remove a sense of incongruity which an operator might feel due to a difference between the reproduction start position and an actual reproduction position. In addition, the illustrated system enables a direct access to the actual reproduction position to quickly move the pickup head 110 to the actual reproduction position. This dispenses with the AND gate 118 included in FIG. 12.

While this invention has thus far been described in conjunction with several embodiments thereof, it will readily be possible for those skilled in the art to put this invention into practice in various other manners. For example, any other recording medium, such as a video tape, may be substituted for the CD-ROM 21. A spatial filter may be located between the local decoder 44 and the subtracter 35. Each prediction error signal may be subjected to orthogonal transform, motion compensation, and/or vector quantization. In order to carry out the orthogonal transform, the quantizer 36 and the local dequantizer 42 may include an orthogonal transform circuit and an orthogonal inverse transform circuit, respectively. On the other hand, the vector quantization can be carried out by including a vector quantization circuit and a vector dequantization circuit in the quantizer and the local dequantizer, respectively.

What is claimed is:

1. An image recording system which is successively supplied with image signals which are to be subjected to redundancy reduction coding, and which records, on a recording medium, recorded signals obtained by processing said image signals, said image signals being representative of moving images and clustered into a plurality of image units each of which is composed of the image signals, wherein the improvement comprises:

code control signal producing means for producing a code control signal which, in order to carry out said redundancy reduction coding, indicates a selected one of a first predictive coding method and a second predictive coding method which are different from each other, said first predictive coding method being carried out by performing a first correlation between adjacent ones of said image units and said second predictive coding method being carried out by performing a second correlation of the image signals within each image unit;

coding means responsive to said code control signal and said image signals for selectively coding said image signals to generate coded signals by carrying out said selected one of the first predictive coding method and said second predictive coding method in response to said code control signal, said coded signals including first coded signals resulting from said first predictive coding method and second coded signals which result from said second predictive coding method and which are interlaced with said first coded signals; and means for recording said first and said second coded signals on said recording medium as said recording signals.

2. An image recording system as claimed in claim 1, said recording medium being selectively rotatable forward and in reverse so that a leading one of said recorded signals and a trailing one of said recorded signals can be located at leading and trailing positions, respectively, when said recording medium is rotated forward, wherein said system reproduces said recorded signals starting from said leading one of the recorded signals, toward said trailing one thereof during a normal reproduction when said recording medium is rotated forward, and wherein said system reproduces said recorded signals from said trailing one of the recorded signals towards said leading one thereof during a reverse reproduction when said recording medium is rotated in reverse, and wherein said reverse reproduction is responsive to said second coded signals.

3. An image recording system as claimed in claim 2, wherein said leading and said trailing ones of the recording signals are coded by using said second predictive coding method.

4. An image recording system as claimed in claim 1, wherein said coding means comprises:

first means responsive to said code control signal and said image signal sequence for selectively carrying out said first predictive coding method and said second predictive coding method to produce said second coded signals preceding said first coded signals; and second means for delaying said second coded signals relative to said first coded signals to produce said coded signals, wherein said first coded signals precede said second coded signals.

5. An image recording system as claimed in claim 1, wherein said code control signal producing means comprises:

control signal producing means for producing said control signal;

index signal producing means for producing an index signal specifying a time instant associated with said second coded signals;

means coupled to said index signal producing means and said coding means for combining said coded signals with said index signal to generate a sequence of combined signals; and means for producing said combined signal sequence as said recorded signals.

6. An image reproduction system for use in reproducing a sequence of coded recorded signals to generate a sequence of reproduced signals, said coded signal sequence being representative of a sequence of moving images and comprising image signals clustered into a plurality of image units, said coded signal sequence selectively comprising first coded signals which are the result of a first predictive coding method which is carried out with reference to a first correlation between adjacent ones of said image units, and second coded signals which are the result of a second predictive coding method which is carried out with reference to a second correlation of the image signals within a single one of said image units, wherein the improvement comprises:

deriving means responsive to said coded signal sequence for deriving only said second coded signals from said coded signal sequence; and means coupled to said deriving means for successively reproducing, as said reproduced signal sequence, said second coded signals derived by said deriving means.

7. An image reproduction system as claimed in claim 6, wherein said deriving means comprises:

man-machine interactive means operable in response to a request indicating a desired reproduction position of a signal desired to be reproduced, for producing a desired position signal representative of said desired reproduction position; and accessing means coupled to said man-machine interactive means for accessing the second coded signals nearest to said desired reproduction position to initially reproduce the last-mentioned second coded signal.

8. An image reproduction system as claimed in claim 7, wherein the last-mentioned second coded signals specify a position signal which is included in said coded signal sequence and which is representative of a position of the last-mentioned second coded signals and which is detected in response to said desired position signal.

9. An image reproducing system as claimed in claim 6, said image reproducing system comprising means operable in combination with a recording medium which is selectively rotatable forward and in reverse, to carry out a normal reproduction of said coded signal sequence when said recording medium is rotated forward, and a reverse reproduction of said coded signal sequence when said recording medium is rotated in reverse, said reproduced signal sequence being sent from said recording medium in a normal order and a reverse order in said normal reproduction and said reverse reproduction, respectively.

10. An image reproducing system as claimed in claim 9, wherein said coded signal sequence comprises said first coded signals placed before said second coded signals in said normal order, and said image reproducing system further comprises:

decoding means for decoding said coded signal sequence during said reverse reproduction with reference to said second coded signals to produce said reproduced signal sequence.

11. An image reproducing system as claimed in claim 10, wherein said decoding means comprises:

delaying means for delaying said second coded signals relative to said first coded signals during said reverse reproduction to produce delayed coded signals;

polarity inverting means for inverting a polarity of said first coded signals during said reverse reproduction to produce polarity-inverted coded signals; and predictive decoding means for predictively decoding said delayed and said polarity-inverted coded signals to generate said reproduced signal sequence to carry out said reverse reproduction.

* * * * *